Figure 12:
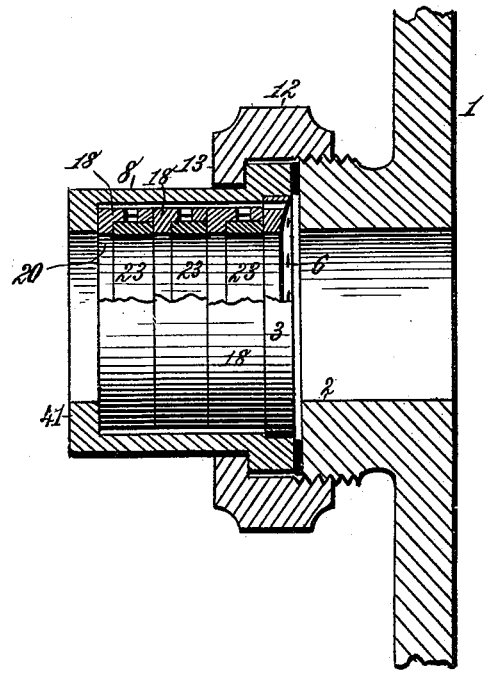

(No Model.)  F. P. & J. T. MARTIN.  2 Sheets—Sheet 1.
ROD PACKING.
No. 470,304.  Patented Mar. 8, 1892.
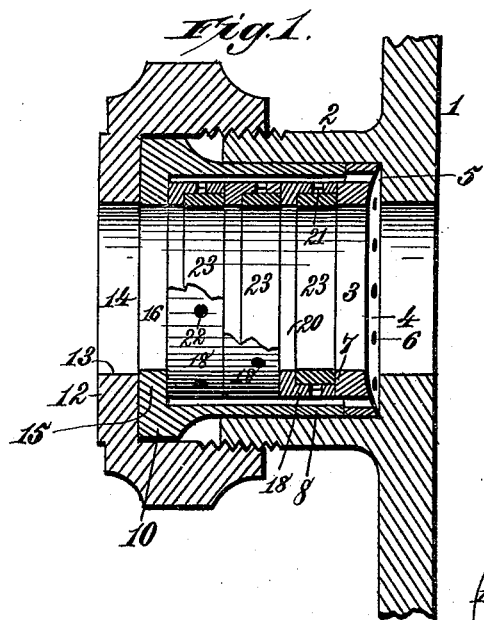
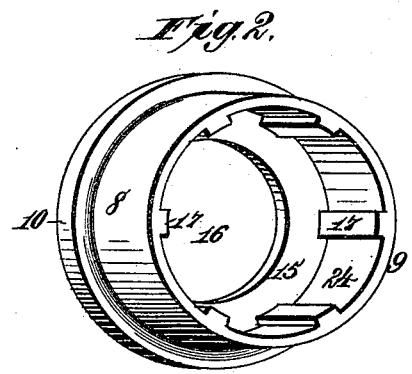
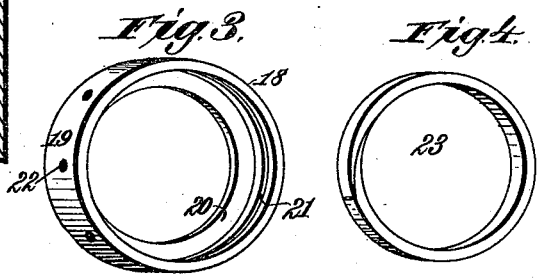
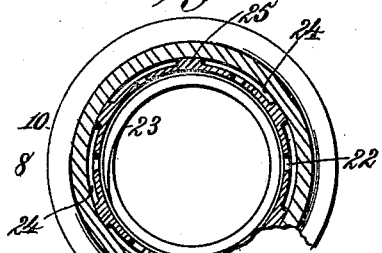
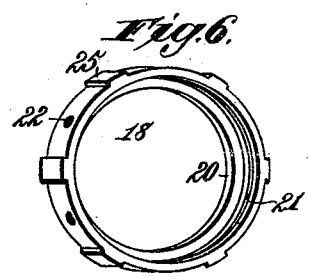
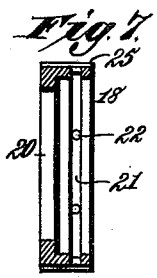
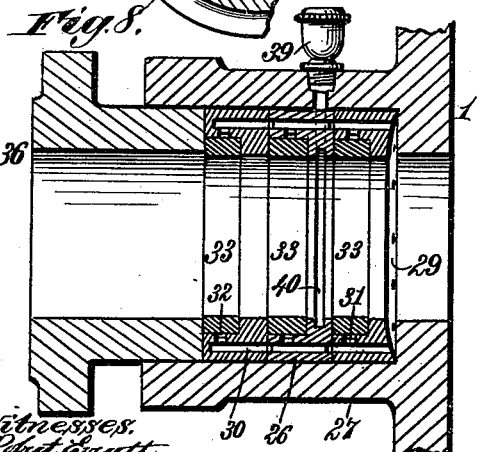
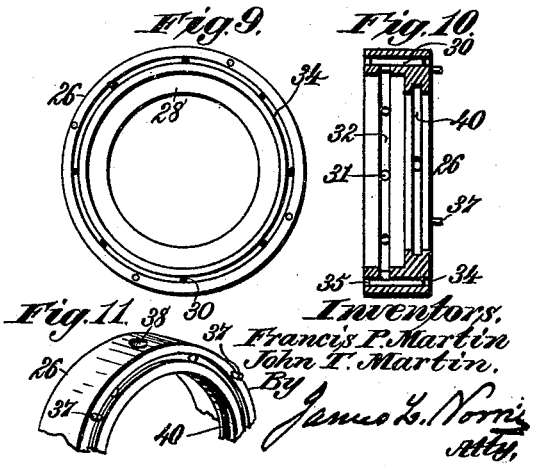

(No Model.) 2 Sheets—Sheet 2.

F. P. & J. T. MARTIN.
ROD PACKING.

No. 470,304. Patented Mar. 8, 1892.

Witnesses.
Robt. Everett.
A. H. Norris.

Inventors.
Francis P. Martin
John T. Martin,
By James L. Norris.
Atty.

UNITED STATES PATENT OFFICE.

FRANCIS P. MARTIN, OF EASTON, AND JOHN T. MARTIN, OF SCRANTON, PENNSYLVANIA.

ROD-PACKING.

SPECIFICATION forming part of Letters Patent No. 470,304, dated March 8, 1892.

Application filed June 28, 1890. Renewed April 2, 1891. Again renewed October 10, 1891. Serial No. 408,302. (No model.)

*To all whom it may concern:*

Be it known that we, FRANCIS P. MARTIN, residing at Easton, in the county of Northampton, and JOHN T. MARTIN, residing at Scranton, in the county of Lackawanna, State of Pennsylvania, both citizens of the United States, have invented new and useful Improvements in Rod-Packings, of which the following is a specification.

Our invention relates to that class of rod-packing or piston-packing shown and described in the Letters Patent granted Francis P. Martin the 7th day of January, 1890, No. 418,802, and also shown and described in the application filed by us upon the 11th day of March, 1890, Serial No. 343,543.

It is the purpose of our said invention to provide a simple and novel construction whereby the several packing-rings employed may each be arranged and wholly contained within a separate ring-seat which shall be independent of the others and similar seats in the containing-gland housing or box surrounding said ring-seats.

It is our purpose, also, to provide a rod-packing wherein one or a series of cleft compressible packing-rings are arranged within independent ring-seats, the latter being placed within a gland or housing, which seats within the stuffing-box upon a ring having a concaved face and having perforations parallel with the axis of the rod and which communicate with similar perforations in the ring-seats, passing entirely through the same, the latter perforations being entered by a series of radial openings, which also communicate with an interior circumferential groove lying directly behind the cleft compressible packing-ring, whereby the pressure of the steam forces the rings against the rod and produces a tight joint.

It is our further purpose to provide a rod-packing in which a series of cleft compressible packing-rings are arranged in independent and separate seats having longitudinal apertures intersecting radial and circumferential channels, whereby a constant intercommunication of steam is provided having common access to the exterior faces of all the packing-rings to bind them against the rod and produce a close and steam-tight packing when steam is thrown in upon that side of the piston upon which said rings are arranged.

It is our further purpose to provide a novel construction whereby oil may be supplied to the piston-rod in such manner as to lubricate the same with uniformity over the whole portion subjected to friction and whereby, also, a great economy in the use of oil may be effected.

It is our purpose, finally, to simplify and improve the rod-packings shown in our previous application and in the Letters Patent already granted us, as hereinbefore specified, to render the same more efficient and durable, to provide novel and simple means for holding the independent ring-seats, whereby the packing may be built up to suit the requirements of the old and new constructions of stuffing-boxes to which it may be applied, and to produce a packing-ring which may be used singly or in series either within a gland or in an ordinary stuffing-box of any known or improved construction.

To these ends our invention consists in the several novel features of construction and new combinations of parts hereinafter fully set forth, and then pointed out definitely in the claims which follow this specification.

To enable others skilled in the art to make and use our invention, we will describe the same in detail, reference being had to the accompanying drawings, in which—

Figure 13:
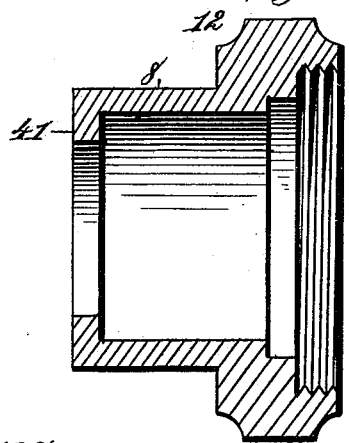

Figure 1 is a central longitudinal section of a stuffing-box and gland having our invention embodied in and combined therewith. Fig. 2 is a detail perspective of the gland shown in Fig. 1 detached. Fig. 3 is a detail perspective of one of the ring-seats. Fig. 4 is a similar view of one of the cleft packing-rings. Fig. 5 is a transverse section showing a modified construction. Fig. 6 is a detail perspective of the ring-seats shown in Fig. 5 removed from the gland or stuffing-box. Fig. 7 is a detail section of the ring-seat shown in Fig. 6. Fig. 8 is a central longitudinal section of a stuffing-box, showing our invention. Fig. 9 is a plan view of one of the ring-seats. Fig. 10 is a section of the same. Fig. 11 is a partial perspective of one of the ring-seats, showing our construction by which the rod may be oiled. Fig. 12 is a sectional view showing a modified construction and arrangement. Fig. 13 is a sectional view showing a further modification of the parts shown in Fig. 12.

In the said drawings the reference-numeral 1 denotes the head of the cylinder, having any ordinary form of stuffing-box 2.

Within the box is inserted a ring 3, having its lower face 4 dressed to a concave form. This ring rests upon the cylinder upon the seat 5, immediately surrounding the piston-opening, and may be ground upon both contacting faces to a steam-tight joint. Near the periphery of the ring are formed a series of steam-openings 6, which open just outside a raised ring or collar 7 upon the upper face of the ring 3.

Seating upon the upper face of the ring 3 is a gland 8, consisting of a cylindrical shell, the open end 9 of which rests upon the ring outside the series of perforations or steam-openings, its outer face being flush with the corresponding face of the ring and both fitting within the stuffing-box. As the gland passes out of the stuffing-box its end is expanded or enlarged to form a head 10, the outer face or periphery of which is of such diameter as to fit smoothly within a ring-nut or cap-nut 12, having a female thread, which engages a male thread on the stuffing-box. The ring-nut 12 is provided with an inwardly-turned flange 13, which rests upon the top of the gland, the rod-opening 14 being slightly in excess of the diameter of the rod. The gland is provided also with a similarly-formed flange or internal collar 15, which has a rod-opening 16, making a close fit upon the rod. Upon its interior face the gland is provided with ribs or projections 17, parallel with its axis and of such thickness that these lie at their ends adjacent to the cylinder against the raised ring 7. These ribs are formed at intervals substantially corresponding with the intervals between the steam-openings 6 in the rings 3.

Within the gland are slipped a series of independent ring-seats 18. (Shown in detail in Fig. 3.) These seats each consist of an annulus 19, having upon one edge an inwardly-turned collar or flange 20, the rod-opening formed thereby being substantially coincident in diameter with the similar openings in the ring 7 and in the outer end of the gland. In the inner face of the annulus 19 is formed a substantially central circumferential groove 21, which intercepts at suitable intervals radial openings 22, pierced entirely through the annulus. Within the latter is slipped a cleft packing-ring 23 (shown in Fig. 4) and formed of any suitable composition or metallic alloy adapted to the purpose. These packing-rings rest upon one edge of the collars 20, their other edges being substantially flush with those of the annuli. The packing is built up to any suitable extent to accommodate the height of the stuffing-box by means of these ring-seats and packing-rings, using from one up to any number required. It will be seen that as steam is thrown into the end of the cylinder next to the stuffing-box it will pass through the steamways 6 in the ring 3, and thence enter the steam-chambers 24 between the ribs or projections 17, whence it flows through the radial steam-openings 22 and enters the channel 21, compressing the packing-rings closely upon the rod and forming a steam fit at each point. As the steam exhausts from this end of the cylinder the pressure upon the rings is instantly relieved, and thus the wear of the packing and the friction upon the rod is greatly reduced.

We may dispense with the ribs or projections 17 and in place thereof form upon each ring-seat, upon the outer face thereof, a series of short ribs or lugs 25, which rest against the inner face of the gland 9, said ribs being arranged between the radial steam-openings, as in Figs. 5 and 6. We may, however, dispense with the gland 8 entirely and employ one or more ring-seats 26 of slightly-modified construction. These ring-seats in their general form correspond closely with those already shown and described, each having an annulus of such exterior diameter as to enter the stuffing-box 27, as in Fig. 8, and being provided also with an internal collar or flange 28, which fits the rod. The lower ring-seat, or that one lying next to the cylinder-head, is formed with a concaved face to provide a steam-chamber 29, which receives steam from the cylinder through the rod-opening. Piercing the annular walls of the ring-seats at suitable intervals are steam openings or ways 30, passing entirely through the annulus and parallel with its axis. Communicating with these openings are radial steamways 31, passing from the inner face of the annulus into each steamway 30, these radial ways being arranged substantially in the central portion of the inner face of the annulus. In this face and intersecting with each radial opening is a channel 32 of shallow depth and having any suitable width. Cleft packing-rings 33 are arranged within each ring-seat in the manner already described in connection with the construction shown in Fig. 1.

In each of the ring-seats, with the exception of the two at the extremes of the series, we form steam-channels 34 and 35, the former in the lower or inner and the latter in the upper or outer face, as shown in Fig. 10. These channels intercept the extremities of the steamways 30, and thereby allow a complete and perfect circulation or communication of steam should the ring-seats shift one upon the other in such manner that the steamways 30 no longer coincide. In the lower or inner ring-seat obviously no channel is required in the concave face, and in the upper or outer seat it is unnecessary, as the steamways 30 do not pass through the annulus and need only be formed of such length as to communicate with the radial openings. The operation of this modified form of packing is so obvious as to require no detailed description. The several ring-seats are held in place by a gland or follower 36, which may be bolted in place by means of bolts passing through opposite lugs, or it may be tapped into the stuffing-box or otherwise fastened.

As it may in some cases be desirable to prevent the ring-seats from turning one upon the other, we may effect this result by means of short dowel-pins 37, arranged between the steamways and entering correspondingly-arranged openings in the adjacent ring-seats.

In order to supply oil to the rod with the utmost economy without waste and with a substantially uniform lubrication of all the parts subjected to friction, we tap through to the stuffing-box a small oil-pipe 38, which passes through one of the ring-seats between the steamways and at such a point in said ring-seat that it may penetrate the interior flange 28 of said ring-seat, thereby opening directly upon the surface of the rod and be discharged between the adjacent cleft packing-rings. This pipe may be connected with an oil-cup 39, or it may communicate with the lubricating-pipe leading from the cab or from any other point. The oil entering by this channel cannot be blown out by the steam, neither is it wiped off the rod by the packing as the rod enters the stuffing-box, as is the case where an exterior application is made. On the contrary, it is retained within the opposite extremities of the point of contact, being substantially retained by the two packing-rings between which it enters, thereby affording much more perfect and complete lubrication and effecting a most important saving in consumption, as we are able to thoroughly and uniformly oil the rod with half the quantity of oil usually consumed. An interior circumferential channel 40 is preferably formed in the inner face of the flange or collar 28, which is penetrated by the oil-pipe. This channel forms a species of reservoir for the oil and aids in preventing it from being carried out of the stuffing-box by the piston or other rod. We may also employ the same construction in the ring-seats 20 for the same purpose.

By the means for oiling the rod hereinbefore shown and described a great economy of oil is effected and the lubricant is applied to the rod at the point where it is most needed and where it will uniformly supply the whole portion subjected to friction. We may effect these results by substituting the same means already described, with the single difference that we may reverse the general arrangements of the parts, as shown in Fig. 12. In this case the housing or gland 8 may be simply turned end for end and seated upon the outer end of the stuffing-box 2, an annular exterior shoulder being formed upon the end seating upon the stuffing-box. At the outer end of the housing 8 is an inwardly-turned collar 41, and the ring-seats 18, with the contained packing-rings 23, are dropped into the housing until it is filled, after which the concaved seating-ring 3 is inserted, as shown, and the housing is set in place, a ring-nut 12, having an inner collar 13, being then dropped over it and engaged with a male thread and the stuffing-box. If desired, a rubber gasket may be inserted between the seating end of the housing and between the same and the end of the stuffing-box. Instead of using a ring-nut, however, we may form opposite lugs on the inverse or lower end of the housing and bolt through the same to the studs on the cylinder-head, such as are commonly formed upon steam-cylinders.

We may also form the housing or casing 8 in one and the same piece with the ring-nut 12, as shown in Fig. 13, and thereby simplify the manufacture, the construction in other respects being unaltered.

What we claim is—

1. In a rod-packing, the combination, with a cylinder and with a stuffing-box thereon, of a series of independent ring-seats arranged within the stuffing-box, each ring-seat being provided with an internal collar supporting a cleft packing-ring of friction metal and with a series of radial openings connected by an interior circumferential channel, the several ring-seats being superimposed one upon the other and the cleft rings being wholly contained within the ring-seats, which rest or abut against each other within a gland provided with steam-chambers communicating with the radial openings in the ring-seats, substantially as described.

2. In a rod-packing, the combination, with a cylinder having a suitable stuffing-box, of one or more ring-seats arranged therein, each consisting of an annulus having an internal collar or flange upon one edge, supporting a cleft compressible packing-ring, each annulus having a series of steamways parallel with its axis, a series of radial openings communicating with the inner face of each annulus and with the said steamways, an interior channel intercepting the open ends of the radial openings, and a circumferential channel intercepting the open ends of said steamways upon the opposite faces of the ring-seats, said ring-seats being arranged, with their contained packing-rings, within the stuffing-box and held by a suitable gland or follower, substantially as described.

3. In a rod-packing, the combination, with a cylinder having a stuffing-box of suitable construction, of one or more ring-seats, each consisting of an annulus having upon one edge an inwardly-turned flange supporting a cleft packing-ring and provided with steamways parallel with the axis of the rod and connected at their opposite ends by channels cut in the opposite faces of the ring-seats and being also provided with radial openings cut from the inner face of the annulus into the steamways, said radial openings being connected by a circumferential channel formed in the inner face of the annulus behind the packing-rings, said ring-seats being connected when more than one is used by dowel-pins, substantially as described.

4. In a rod-packing, the combination, with a cylinder having a suitable stuffing-box, of one or more ring-seats contained therein, each provided with a cleft packing-ring seating upon a flange in the ring-seat, the latter having intercommunicating steamways, radial openings and circular channels whereby steam may be thrown behind said cleft rings, and an oiling-pipe entering the stuffing-box and penetrating one of the ring-seats between the steamways, whereby oil may be fed directly to the surface of the rod between the extremities of the stuffing-box, substantially as described.

In testimony whereof we have affixed our signatures in presence of two witnesses.

FRANCIS P. MARTIN.
JOHN T. MARTIN.

Witnesses:
JOSEPH P. HOGAN,
THOMAS J. DOLLARD.